United States Patent [19]

Flannery et al.

[11] 4,298,390

[45] Nov. 3, 1981

[54] FLUOROPHOSPHATE OPAL GLASSES

[75] Inventors: James E. Flannery, Corning; John L. Stempin, Beaver Dams; Dale R. Wexell, Corning, all of N.Y.

[73] Assignee: Corning Glass Works, Corning, N.Y.

[21] Appl. No.: 177,627

[22] Filed: Aug. 13, 1980

[51] Int. Cl.$^3$ .......................... C03C 3/04; C03C 3/08
[52] U.S. Cl. .................................. 501/32; 501/57.151
[58] Field of Search ................. 106/54, 52, 39.6, 73.1

[56] References Cited

U.S. PATENT DOCUMENTS

| | | | |
|---|---|---|---|
| 2,394,502 | 2/1946 | Weyl et al. | 106/52 |
| 2,559,805 | 7/1951 | Stookey | 106/52 |
| 3,498,805 | 3/1970 | Stalego | 106/54 |

*Primary Examiner*—Helen M. McCarthy
*Attorney, Agent, or Firm*—Clinton S. Janes, Jr.

[57] ABSTRACT

This invention is directed to spontaneous opal glasses wherein $Ba_2F(PO_4)$ constitutes the predominant crystalline opal phase. The glasses exhibit softening points in excess of 710° C., excellent chemical durability, and consist essentially, in weight percent on the oxide basis, of 6-10% $Na_2O$, 1-6% $K_2O$, 4-11% BaO, 9-18% $Al_2O_3$, 50-70% $SiO_2$, 3.5-7% $P_2O_5$, and 1-4% F.

2 Claims, 1 Drawing Figure

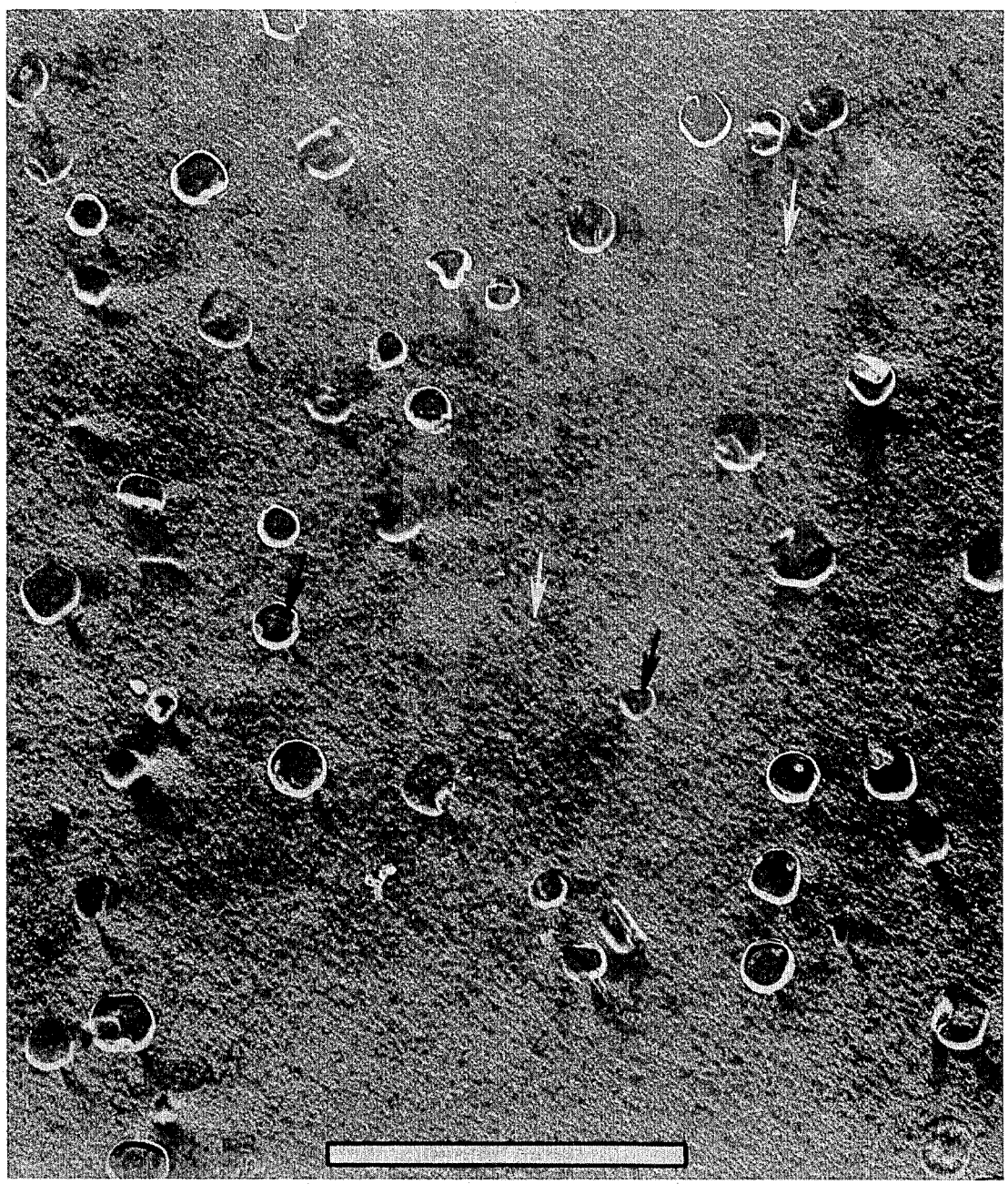

FLUOROPHOSPHATE OPAL GLASSES

BACKGROUND OF THE INVENTION

As recognized in the art, opal glasses contain small particles which scatter light passing through the glass, thereby rendering such glasses light diffusing. Hence, opal glasses will always consist of a transparent glassy matrix and at least one other phase dispersed therewithin. The dispersed phase(s) may be either crystalline or amorphous. The primary characteristics of the dispersed or opacifying phase which determine the density of light transmission include the refractive index, the dispersion, the size and shape of the particles, the particle distribution, and the absolute number of particles.

There are two broad classes of opal glasses, viz., spontaneous opals and thermally opacifiable or reheat opals. Spontaneous opal glasses are characterized by the fact that the light-diffusing phase separates out ("strikes in") during the cooling and forming of the melt into a glass article. In contrast, the rate of opal development, i.e., the rate at which the light-diffusing phase separates out of the glassy matrix, is relatively slow in the thermally opacifiable glasses. Consequently, upon cooling and shaping the melt into a glass article, a substantially clear or only faintly opacified appearance is observed. The glass article must be reheated to temperatures in and/or above the transformation range of the glass to promote separation of the opacifying phase(s). It will be appreciated that, from a commercial point of view, spontaneous opal glasses are much to be preferred since no reheating is demanded to achieve the desired opacity.

There are two general categories of spontaneous opal glasses, the first being characterized as having an amorphous (non-crystalline) opacifying phase and the second having a crystalline opacifying phase. The first type has been termed immiscible opals, i.e., opals wherein the opacifying phase is a glass which is not soluble in the matrix. The most ommon immiscible opals contain borate or phosphate in the opacifying phase. U.S. Pat. Nos. 2,559,805 and 3,275,492 are illustrative of those. U.S. Pat. No. 3,661,601 describes another immiscible opal containing phase separated droplets or opacifying particles consisting of CaO and F or CaO, F, $B_2O_3$, and $SiO_2$. Numerous crystals have been precipitated to constitute the opacifying phase, the most common being either an alkali metal fluoride (most frequently NaF) or an alkaline earth metal fluoride (most often $CaF_2$).

In summary, a spontaneous opal glass attains the vast majority of its opacity during the cooling of the melt to a glass article and requires no reheating. Thus, the opacifying agent strikes in during the shaping of the melt to a glass article utilizing such conventional glass forming techniques as blowing, casting, drawing, pressing, rolling, and spinning.

SUMMARY OF THE INVENTION

The present invention defines a narrow range of compositions within the $Na_2O$-$K_2O$-$BaO$-$Al_2O_3$-$B_2O_3$-$SiO_2$-$P_2O_5$-F system which provide spontaneous opal glasses manifesting dense white opacity and excellent chemical durability, i.e., high resistance to attack by water, food acids, and detergent solutions, thereby recommending their utility in food service applications. Thus, the base glass compositions, expressed in terms of weight percent on the oxide basis, consist essentially of 6-10% $Na_2O$, 1-6% $K_2O$, 4-11% BaO, 9-18% $Al_2O_3$, 1-5% $B_2O_3$, 50-70% $SiO_2$, 3.5-7% $P_2O_5$, and 1-4% F. Optionally, the glasses may also contain up to about 3.5% CaO and/or up to 5% total of SrO and/or MgO to modify the melting and forming character of the glass as well as the physical properties thereof. Nevertheless, the sum of those three ingredients plus any other extraneous components will not exceed about 5% by weight. A barium fluorophosphate-type crystal phase constitutes the opacifying agent. The appended electron micrograph illustrates this crystal phase interspersed in the glassy matrix, the arrows indicating the presence of spherules containing the crystal phase.

The glasses of this fluorophosphate opal system are characterized by a two-stage liquidus phenomenon. A high temperature cloudiness or opacification has been observed which can be characterized as an emulsification or liquid-liquid phase separation. Analysis of the separating phase has indicated it to be rich in $Na_2O$, BaO, $P_2O_5$, and F. The normal crystallization opal liquidus occurs in the range of about 400°–1000° C., depending upon the relative concentration of the aforementioned species. X-ray diffraction analyses of the crystalline opal phase have identified the predominant crystal phase to be of a $Ba_2(OH)PO_4$ type. However, it is assumed that F easily substitutes for OH in this species. X-ray analysis does not distinguish between F and OH. Accordingly, the phase has been termed $Ba_2F(PO_4)$. Minor amounts of $NaBaPO_4$ and other presently-unidentifiable species have also been detected. Those glasses exhibiting low temperature crystallization opal liquidi have the capability of striking in further during the annealing process. The most desirable glass would remain essentially clear during the forming steps and then opacify in the course of annealing. Such glasses would be free from differential opacification, a problem sometimes encountered with glasses demonstrating high opal liquidus temperatures. It has been noted, however, that in some instances glasses having low temperature opal liquidi are also subjected to surface crystallization developed during the annealing heat treatment. That occurrence leads to a substantial loss of glossy appearance in the final product and/or reduced chemical durability as witnessed in detergent testing.

The inventive fluorophosphate opal glass system is composition sensitive with regard to maintaining the desired combination of excellent chemical durability and resistance to weathering, high softening point, and dense white opacity. High levels of $Al_2O_3$ are crucial in achieving the desired detergent durability, as evidenced in resistance to alkali attack, and in substantially eliminating weathering. It is conjectured that $Al_2O_3$ densifies the glassy matrix, thereby inhibiting gross migration of $Na^+$ and $F^-$ ions to the glass surface. The content of $Na_2O$ ought not to exceed about 10% to insure high resistance to weathering. Amounts of $Na_2O$ in excess of 10% also tend to raise excessively the coefficient of thermal expansion, lower the softening point, and, where present in quantities greater than 14%, decrease opacity. A minimum softening point of about 710° C. has been deemed necessary to permit the use of satisfactory enamel fluxes in the decoration process. However, high toxic metal releases from softer (lower temperature) enamels preclude the use for food service ware of substrate glasses having softening points substantially lower than about 780° C. Accordingly, glasses having softening points of at least 780° C. are greatly to be preferred.

Minimum levels of 3.5% $P_2O_5$ and 4% BaO are demanded to achieve the desired opacity. Dense opacity is ensured with 5–10% BaO. Excessive quantities of BaO impart two deleterious effects. First, the microwave susceptibility of the glass greatly increases, thereby hazarding breakage in a microwave oven. Second, the density of the glass increases sharply, thereby yielding heavy finished ware. Excessive concentrations of $P_2O_5$ can adversely affect the chemical durability of the glasses and the meltability of the glass.

The reactive contents of $Na_2O$, BaO, $P_2O_5$, and F govern the identity of the principal crystal phase. A minimum level of 1% F retained in the glass is adequate to generate the fluorophosphate phase and to hold the working or forming temperatures at about 1325° C. or below. A 2–3% F content is preferred to maximize opacity and whiteness and to decrease the forming temperature. Such levels of F are also much less polluting of the environment than the conventional NaF and $CaF_2$ opal glasses of commerce which customarily employ 5% and more F. In the present glass compositions, about 70–80% of the fluoride in the batch materials will be retained in the shaped glass articles. Fluoride exerts a profound effect upon the viscosity of the glass as indicated by the softening point. For example, a 1% addition of fluoride to the base glass composition yields an increase in the softening point thereof of about 50° C. Consequently, adjustments of fluoride content provide for a wide latitude of softening points. It is postulated that this pronounced dependence of the glass upon fluoride levels reflects the fluorine atom entering the matrix of the glass structure.

$B_2O_3$ and $K_2O$ are important fluxing agents in the inventive glasses. In contrast to $Na_2O$, $B_2O_3$ or $B_2O_3$ together with $K_2O$ can be used to decrease the coefficient of thermal expansion of the glasses. These components are included to insure a high temperature working viscosity corresponding to about 1325° C. or lower. Hence, elimination of $K_2O$ or $B_2O_3$ causes a dramatic increase in the high temperature working viscosity unless the $Na_2O$ content is raised proportionately. Such action adversely affects the expansion and durability of the glasses. Nevertheless, the level of $K_2O$ should not exceed about 6% because opacity appears to decrease due to the increased fluxing behavior exerted by the oxide. Thus, the opacifying crystal phase seems to be much more soluble in the $K_2O$-enriched matrix glass. Furthermore, and very importantly, the quantity of $B_2O_3$ ought to be maintained below 5% to forestall solubility of the crystal phase.

Concentrations of CaO in excess of 3% and MgO and/or SrO greater than 5% result in the glasses displaying very high emulsion liquidus temperatures coupled with opacification in the melt. Hence, high levels of those ingredients lead to devitrification of the glass. Thus, calcium and strontium phosphates are significantly less soluble in the glass matrix than are sodium barium phosphate or barium fluorophosphate. As a result, ware formed from such opal glasses demonstrate "mother-of-pearl" or iridescent surfaces, this phenomenon being derived from light refraction in the elongated crystals forming on or near the surface of the glass. Small quantities of CaO, MgO, and/or SrO can be useful in modifying the physical properties of the glass while not substantially altering the opacity or chemical durability thereof.

Where a colored opal glass is desired, conventional glass colorants, such as CoO, $Cr_2O_3$, CuO, $Fe_2O_3$, $MnO_2$, NiO, and $V_2O_5$ may be included in customary amounts, normally less than about 2%.

PRIOR ART

U.S. Pat. No. 2,394,502 describes the production of opal glasses containing fluorapatite [$3R_3(PO_4)_2 \cdot RF_2$], wherein R is selected from the group of Ca, Ba, and Pb, as the primary crystalline opacifying phase. The glasses consist essentially, in weight percent on the oxide basis, of 12–17% $Na_2O+K_2O$, up to 12% CaO, up to 4% BaO, up to 5% PbO, 0–6% $Al_2O_3$, 0–50% $B_2O_3$, 4–9% $P_2O_5$, 54–66% $SiO_2$, and 2.5–5% F. The $Al_2O_3$ content of the patented glasses is far below that required in the compositions of the instant invention plus the crystalline opacifying phase is different from the $Ba_2F(PO_4)$ species of the inventive glasses.

U.S. Pat. No. 2,559,805 discusses the production of opal glasses containing $Ba_3(PO_4)_2$ as the predominant crystalline opacifying phase. The glasses consist essentially, in weight percent on the oxide basis, of 7–15% alkali metal oxide, 5–25% BaO, 0–25% $B_2O_3$, 2–10% $P_2O_5$, 0–10% $Al_2O_3$, and 50–70% $SiO_2$. Fluoride is nowhere indicated as being part of the glass composition so, consequently, the crystalline opacifying phase cannot be $Ba_2F(PO_4)$.

U.S. Pat. No. 3,275,492 discloses the production of opal glasses consisting essentially, in mole percent on the oxide basis, of 10–27% $B_2O_3$ (equivalent to 12–30% by weight), 66–81% $SiO_2$ (equivalent to 62–76% by weight), 3–24% of an oxide selected from the group of ZnO, MgO, CaO, BaO, NiO, MnO, CoO, and CuO, and 1–7% alkali metal oxide. It is observed that, optionally, up to 4 mole percent F, up to 2 mole percent $P_2O_5$, or up to 5 mole percent may be included. The $B_2O_3$ contents are much higher than those that can be tolerated in the instant inventive glasses. Furthermore, there is no teaching of the presence of any crystalline opacifying phase.

U.S. Pat. No. 3,498,801 relates to the production of opal glasses wherein opacification results from a liquid-liquid separation of a phosphate phase from the glass matrix. The glasses consist essentially, in weight percent on the oxide basis, of 9–13.5% alkali metal oxides, 1–2% CaO, 0–1.5% BaO, 5–12% $B_2O_3$, 4–8% $Al_2O_3$, 3–5.5% $P_2O_5$, and 60–68% $SiO_2$. Fluoride is not a constituent of the glasses, the $Al_2O_3$ content is lower and the $B_2O_3$ level higher than demanded in the instant inventive glasses. Moreover, the opacifying phase in the patented glasses is non-crystalline.

U.S. Pat. No. 3,661,601 is concerned with opal glasses wherein glassy particles comprise the opal phase which consist essentially, in weight percent on the oxide basis, of 3–10% $Na_2O+K_2O$, 11–20% CaO, 0–10% BaO, 3–9% $Al_2O_3$, 1–7% $B_2O_3$, 0–10% $P_2O_5$, 50–75% $SiO_2$, and 2–4% F. The concentration of CaO is much higher and the $Al_2O_3$ content lower than required in the instant inventive glasses. Furthermore, the opacifying phase in the patented glasses is non-crystalline.

U.S. Pat. No. 3,667,973 is directed to opal glasses wherein the opal phase is in the form of encapsulated crystalline droplets of NaF, LiF, and/or KF, possibly containing $B_2O_3$ as an impurity. The glasses consist essentially, in weight percent on the oxide basis, of 1.5–4% $Li_2O$, 0–10% $Na_2O+K_2O$, 0–1% BaO, 1–3% $Al_2O_3$, 7–14% $B_2O_3$, 0–10% $P_2O_5$, 70–80% $SiO_2$, 1–3% $MoO_3$ and/or $As_2O_3$ and/or $WO_3$, and 3–6% F. The $B_2O_3$ level is higher and the BaO and $Al_2O_3$ concentrations much lower than useful in the instant inventive glasses. Also, the opacifying phase in the patented glass is not $Ba_2F(PO_4)$.

DESCRIPTION OF THE PREFERRED EMBODIMENTS

Table I records glass compositions, expressed in terms of parts by weight on the oxide basis as calculated from the batch, illustrating the compositional parameters of the instant invention. Inasmuch as it is not known with which cation(s) the fluoride is combined, it is merely reported as fluoride (F) in accordance with conventional glass analysis practice. Moreover, because the sum of the several components totals or approximately totals 100, for all practical purposes the values tabulated may be considered to be expressed in terms of weight percent. Where desired, an oxide of arsenic or a chloride salt can be included in the batch to perform their customary function of a fining agent.

The actual batch ingredients may comprise any materials, either the oxides or other compounds, which, when melted together, will be converted into the desired oxide in the proper proportions. The fluoride will typically be added as sodium silicofluoride. Whereas the following description reflects laboratory and pilot plant scale melting, it will be understood that the recited compositions would also be operable in large scale commercial melting units.

The batch ingredients were compounded, tumble mixed together to aid in securing a homogeneous melt, and placed into platinum crucibles. The crucibles were introduced into an electrically-fired furnace operating at 1450°–1550° C. and the batches melted for four hours (after last fill). The melts were then cast into steel molds to produce slabs about 6"×6"×½" or manually pressed discs having a diameter of 3–4" and a thickness of 0.125–0.25". The pressed discs were undertaken as a rather primitive form of quick quenching such as is encountered in commercial automatic pressing. The glass slabs were immediately transferred to an oven operating at the annealing temperature, that temperature maintained for one hour, and then cooled to room temperature at furnace rate, i.e., at about 30° C./hour.

Additionally, 750-pound melts of certain glasses were made in gas-fired pilot plant furnaces, the glass hand gathered at 1200°–1400° C., depending upon viscosity, and hand pressed in cast iron molds with steel plungers. Baking dishes and dinner plates were formed in this manner and annealed in a lehr. Where desired, the ware was firepolished utilizing conventional practices.

Table II illustrates the retention of fluoride in the glass as analyzed.

TABLE I

| | 1 | 2 | 3 | 4 | 5 | 6 | 7 | 8 |
|---|---|---|---|---|---|---|---|---|
| $SiO_2$ | 56.00 | 56.24 | 54.62 | 60.10 | 58.67 | 60.50 | 58.80 | 59.62 |
| $Al_2O_3$ | 14.35 | 14.80 | 14.19 | 10.34 | 12.40 | 13.00 | 10.30 | 13.30 |
| $Na_2O$ | 8.02 | 8.20 | 7.85 | 8.60 | 8.39 | 8.50 | 7.10 | 8.51 |
| $K_2O$ | 4.50 | 5.95 | 5.70 | 4.82 | 4.73 | 4.50 | 5.40 | 2.05 |
| $B_2O_3$ | 3.24 | 3.30 | 3.17 | 3.46 | 4.00 | 2.00 | 3.50 | 3.25 |
| $P_2O_5$ | 5.99 | 4.10 | 3.91 | 4.26 | 4.18 | 5.00 | 5.10 | 4.14 |
| BaO | 6.47 | 4.40 | 10.56 | 6.92 | 6.14 | 5.00 | 7.70 | 6.20 |
| CaO | 1.42 | 3.06 | — | 1.52 | 1.49 | 1.50 | — | 1.54 |
| MgO | — | — | — | — | — | — | 2.00 | 1.75 |
| F | 4.28 | 2.20 | 2.20 | 2.20 | 2.20 | 2.25 | 2.70 | 2.21 |

| | 9 | 10 | 11 | 12 | 13 | 14 | 15 | 16 |
|---|---|---|---|---|---|---|---|---|
| $SiO_2$ | 60.11 | 59.30 | 60.85 | 58.40 | 63.10 | 60.90 | 63.90 | 69.70 |
| $Al_2O_3$ | 13.25 | 10.40 | 12.70 | 14.80 | 12.20 | 12.10 | 10.10 | 4.70 |
| $Na_2O$ | 8.51 | 8.10 | 8.75 | 8.20 | 9.70 | 8.50 | 7.80 | 10.00 |
| $K_2O$ | 3.46 | 2.70 | 2.60 | 1.90 | — | 2.70 | — | — |
| $B_2O_3$ | 2.41 | 4.60 | 1.00 | 3.33 | 3.10 | — | 3.10 | 3.20 |

TABLE I-continued

| $P_2O_5$ | 4.04 | 5.20 | 4.10 | 4.10 | 5.30 | 5.50 | 5.20 | 5.50 |
|---|---|---|---|---|---|---|---|---|
| BaO | 6.63 | 7.80 | 6.70 | 6.60 | 4.60 | 8.20 | — | — |
| CaO | 1.59 | — | 1.80 | 1.50 | — | — | 2.10 | 2.20 |
| MgO | — | 2.10 | 1.50 | 1.20 | 2.10 | 2.20 | 7.90 | 4.70 |
| F | 2.19 | 2.80 | 2.25 | 3.00 | 1.70 | 3.30 | 1.70 | 1.80 |

| | 17 | 18 | 19 | 20 | 21 | 22 |
|---|---|---|---|---|---|---|
| $SiO_2$ | 58.83 | 60.00 | 63.05 | 64.50 | 55.10 | 62.30 |
| $Al_2O_3$ | 16.51 | 14.85 | 4.25 | 4.40 | 14.47 | 4.58 |
| $Na_2O$ | 8.48 | 9.30 | 11.90 | 12.40 | 8.00 | 11.96 |
| $K_2O$ | 4.72 | — | — | — | 5.83 | — |
| $B_2O_3$ | — | 3.35 | 4.70 | 4.90 | 3.23 | 2.60 |
| $P_2O_5$ | 4.18 | 4.10 | 5.30 | 7.80 | 3.99 | 5.31 |
| BaO | 5.68 | 6.70 | — | — | 2.15 | 8.03 |
| CaO | 1.59 | 1.50 | — | 6.10 | — | — |
| MgO | — | 1.16 | — | — | — | 2.11 |
| SrO | — | — | 10.80 | — | 7.28 | — |
| F | 2.16 | 2.77 | 1.30 | 5.30 | 2.14 | 3.41 |

TABLE II

| | A | B | C | D | E |
|---|---|---|---|---|---|
| $SiO_2$ | 56.36 | 56.36 | 56.36 | 56.36 | 56.36 |
| $Al_2O_3$ | 15.84 | 15.84 | 15.84 | 15.84 | 15.84 |
| $Na_2O$ | 8.06 | 8.06 | 8.06 | 8.06 | 8.06 |
| $K_2O$ | 4.53 | 4.53 | 4.53 | 4.53 | 4.53 |
| $B_2O_3$ | 3.25 | 3.25 | 3.25 | 3.25 | 3.25 |
| $P_2O_5$ | 4.02 | 4.02 | 4.02 | 4.02 | 4.02 |
| BaO | 6.51 | 6.51 | 6.51 | 6.51 | 6.51 |
| CaO | 1.43 | 1.43 | 1.43 | 1.43 | 1.43 |
| F (batch) | 3.76 | 2.96 | 2.15 | 1.61 | 0.81 |
| F (anal.) | 2.87 | 2.19 | 1.61 | 1.24 | 0.57 |

Table III reports softening points (S.P.) in terms of °C. and coefficients of thermal expansion over the range of 25°–300° C. (Exp.) in terms of ×10$^{-7}$/°C. determined in accordance with measuring techniques conventional in the glass art. The development of devitrification (devit.) during the determination of the softening point is noted. High temperature viscosities were measured employing cooling rates of 2° C./minute.

High speed emulsion and crystalline opal liquidus data (°C.) were obtained utilizing a hot stage microscope composite apparatus.

Samples of the glasses were screened for potential weathering problems by boiling in water for six hours, wiping dry, and thereafter heating at 300° C. for 15 minutes. Glasses having any surface crazing or crizzling observed either macroscopically or microscopically were adjudged failures. $Na_2O$ extraction levels, determined after boiling a glass sample in distilled water for one hour, were also deemed to provide an indication of potential weathering problems. Hence, samples demonstrating $Na_2O$ extraction quantities less than 4 μg/cm$^2$ were considered to be desirably resistant to weathering.

An empirical visual estimation of the density of opacification is also recorded. The term dense signifies that the sample exhibited no translucency in the pressed ware or annealed slabs.

In conducting a test for determining the resistance of the inventive glasses to detergents, samples were immersed into a 0.3% aqueous solution of SUPER SOILAX ® detergent, marketed by Economics Laboratories, St. Paul, Minnesota, operating at 95° C. for intervals of 24, 48, 72, and 96 hours. The surface areas of the samples were limited to the ratio of 12 square inches to one pound of the solution. The samples were removed periodically from the hot solution, rinsed in tap water, and wiped dry. A portion of each sample was coated with DYE-CHECK ® dye penetrant, marketed by Magna-Flux Corporation, Chicago, Illinois, and the dye permitted to remain thereon for 20 seconds. Samples which manifested no dye penetration, i.e., no stain was evident after the dye was wiped clean with a dry cloth, were classified as "AA". Samples from which the stain could be removed with a cloth wetted with SUPER SOILAX ® detergent, were categorized as "A". Samples from which the stain could be removed with a dampened cloth and a commercial powdered cleanser were tabulated as "B". Finally, samples from which the stain could not be removed via any of the above procedures were listed as "C". When samples received a rating of "B" or less, the testing was not continued. Where visual observation indicated a particular sample exhibited any loss of gloss in the testing, that sample was given a "loss of gloss" rating, which was considered to be equivalent to a "C" rating.

physical properties along with satisfactory melting and forming characteristics. Example C of Table II represents the most preferred composition in overall terms of forming behavior, chemical durability, and physical properties.

We claim:

1. A spontaneous opal glass demonstrating a dense white appearance, a softening point of at least 710° C., excellent chemical durability, and containing $Ba_2F(PO_4)$ as the predominant crystalline opal phase consisting essentially, expressed in terms of weight percent on the oxide basis, of 6–10% $Na_2O$, 1–6% $K_2O$, 4–11% BaO, 9–18% $Al_2O_3$, 1–5% $B_2O_3$, 50–70% $SiO_2$, 3.5–7% $P_2O_5$, and 1–4% F.

2. A spontaneous opal glass according to claim 1 which also contains up to 3.5% CaO and/or up to 5% total of MgO and/or SrO.

TABLE III

|  | 1 | 2 | 3 | 4 | 5 | 6 | 7 | 8 | 9 | 10 | 11 |
|---|---|---|---|---|---|---|---|---|---|---|---|
| Opacity | Dense | Dense | Dense | Dense | Dense | Dense | Dense | Dense | Dense | Dense | Dense |
| S.P. | 733 | 746 | 718 | 735 | 726 | 809 | 782 | 845 | 780 | 802 | 798 |
| Exp. | 84.1 | 88.7 | 88.6 | 82.1 | 85.0 | 85.9 | 86.5 | 77.8 | 81.5 | 81.2 | 78.2 |
| Na₂O Extraction | — | 4.1 | 2.5 | — | 2.0 | 4.6 | 4.0 | 1.7 | 4.4 | 1.8 | 2.3 |
| Detergent 24 hrs | A | AA | AA | A* | AA | A | A | A | A | A | A |
| Rating 48 hrs | A | AA | A | A* | A | A | A-A* | A | A | A | A |
| 72 hrs | A* | A | A | B* | A | A-B | A-A* | A | A | A | A* |
| 96 hrs | — | A-C | A | — | A | A-B | A-A* | A | A | A | A* |
| Lowest Forming Temp. - Hand Pressing (°C.) | — | 1250 | 1215 | — | 1205 | 1250 | 1280 | 1290 | 1345 | 1275 | 1290 |
| Emulsion Liquidus | 1240 | 1060 | 1010 | 1180 | 1140 | 1200 | 1050 | 1170 | 1160 | 1150 | 1160 |
| Crystalline Opal Liquidus | 1030 | 1100 | 570 | 500 | 700 | 695 | 650 | 700 | 600 | 650 | 520 |

|  | 12 | 13 | 14 | 15 | 16 | 17 | 18 | 19 | 20 | 21 | 22 |
|---|---|---|---|---|---|---|---|---|---|---|---|
| Opacity | Dense | Dense | Dense | Dense | Dense | Dense | Dense | Dense | Dense | Dense | Dense |
| S.P. | 780 | 815 | — | 867 | 800 | 810 | 819 | Devit | Devit | — | 770 |
| Exp. | 81.0 | — | — | 76.8 | 79.0 | 82.1 | 73.7 | 63.0 | — | — | 85.1 |
| Na₂O Extraction | 1.9 | 2.8 | 7.8 | 2.15 | 13.8 | 2.8 | 1.1 | — | — | — | 15 |
| Detergent 24 hrs | A | A | A | A | A* | AA | A | A | Scum in the melt | A* | A |
| Rating 48 hrs | A | A* | A | A | A* | A | A | A | | A* | C |
| 72 hrs | A | B* | A* | A | — | A | A | B | | B* | — |
| 96 hrs | A | — | — | A | — | A | A | C | | — | — |
| Lowest Forming Temp. - Hand Pressing (°C.) | 1320 | 1280 | 1335 | 1380 | 1230 | 1300 | 1290 | — | — | — | — |
| Emulsion Liquidus | 1150 | — | 1100 | 1050 | 1000 | 1180 | 1110 | 1500 | — | 1500 | 1340 |
| Crystalline Opal Liquidus | 820 | 900 | 680 | 990 | 920 | 700 | 750 | 810 | — | — | 580 |

|  | A | B | C | D | E |
|---|---|---|---|---|---|
| Opacity | Dense | Dense | Dense | Dense | Dense |
| S.P. | 726 | 775 | 806 | 839 | 876 |
| Exp. | 85.6 | 81.7 | 80.9 | 82.3 | 84.1 |
| Na₂O Extraction | 2.7 | — | 2.8 | — | — |
| Detergent 24 hrs | A | — | AA | — | — |
| Rating 48 hrs | A | — | A | — | — |
| 72 hrs | A | — | A | — | — |
| 96 hrs | A | — | A | — | — |
| Lowest Forming Temp. - Hand Pressing (°C.) | 1250 | — | 1300 | — | — |
| Emulsion Liquidus | 1150 | 1120 | 1150 | 1280 | 1180 |
| Crystalline Opal Liquidus | 580 | 570 | 620 | 690 | 680 |

*Loss of Gloss

A study of Table III in conjunction with Tables I and II immediately points up the criticality of composition control to secure glasses demonstrating the desired

* * * * *